(12) United States Patent
Tenno et al.

(10) Patent No.: US 12,027,721 B2
(45) Date of Patent: Jul. 2, 2024

(54) ELECTRONIC DEVICE

(71) Applicant: Murata Manufacturing Co., Ltd., Nagaokakyo (JP)

(72) Inventors: Nobuyuki Tenno, Nagaokakyo (JP); Yasushi Oyama, Nagaokakyo (JP); Daisuke Sakai, Nagaokakyo (JP); Byung No Bae, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 268 days.

(21) Appl. No.: 17/730,285

(22) Filed: Apr. 27, 2022

(65) Prior Publication Data

US 2022/0255180 A1    Aug. 11, 2022

Related U.S. Application Data

(63) Continuation of application No. PCT/JP2020/045559, filed on Dec. 8, 2020.

(30) Foreign Application Priority Data

Dec. 11, 2019    (JP) .................................. 2019-223378

(51) Int. Cl.
    *H01M 50/284*    (2021.01)
    *H01M 50/296*    (2021.01)
    *H01Q 1/22*    (2006.01)
    *H01Q 9/04*    (2006.01)

(52) U.S. Cl.
    CPC ....... *H01M 50/284* (2021.01); *H01M 50/296* (2021.01); *H01Q 1/2283* (2013.01); *H01Q 9/0407* (2013.01)

(58) Field of Classification Search
    None
    See application file for complete search history.

(56) References Cited

U.S. PATENT DOCUMENTS

| 10,868,356 | B1* | 12/2020 | Da Costa Bras Lima ................. H01Q 5/321 |
| 2008/0316115 | A1 | 12/2008 | Hill et al. |
| 2019/0288399 | A1* | 9/2019 | Tanaka ................. H01Q 13/106 |
| 2020/0119453 | A1 | 4/2020 | Takayama et al. |

(Continued)

FOREIGN PATENT DOCUMENTS

| JP | 2010-531574 A | 9/2010 |
| WO | 2016/186090 A1 | 11/2016 |

(Continued)

OTHER PUBLICATIONS

Official Communication issued in International Patent Application No. PCT/JP2020/045559, mailed on Feb. 22, 2021.

*Primary Examiner* — Wilson Lee
(74) *Attorney, Agent, or Firm* — Keating & Bennett, LLP (57) ABSTRACT

An electronic device includes a flexible substrate, a circuit substrate, and a battery pack including a conductor portion. The battery pack includes a battery that supplies power to the circuit substrate and includes a main surface and a side surface. The flexible substrate includes a radiating conductor. The flexible substrate includes bent portions at a central portion in the direction in which a transmission line extends so that the flexible substrate faces the side surface. The radiating conductor overlaps the conductor portion of the main surface of the battery pack in plan view.

20 Claims, 7 Drawing Sheets

(56) References Cited

U.S. PATENT DOCUMENTS

| | | | |
|---|---|---|---|
| 2020/0280120 A1* | 9/2020 | Niakan | H01Q 21/28 |
| 2021/0066799 A1* | 3/2021 | Avser | H01Q 5/25 |
| 2021/0075090 A1* | 3/2021 | Yarga | H01Q 1/241 |

FOREIGN PATENT DOCUMENTS

| | | |
|---|---|---|
| WO | 2016/186092 A1 | 11/2016 |
| WO | 2018/230475 A1 | 12/2018 |

\* cited by examiner

ELECTRONIC DEVICE

CROSS REFERENCE TO RELATED APPLICATIONS

This application claims the benefit of priority to Japanese Patent Application No. 2019-223378 filed on Dec. 11, 2019 and is a Continuation application of PCT Application No. PCT/JP2020/045559 filed on Dec. 8, 2020. The entire contents of each application are hereby incorporated herein by reference.

BACKGROUND OF THE INVENTION

1. Field of the Invention

The present invention relates to an electronic device including a patch antenna, a circuit substrate, and a battery pack.

2. Description of the Related Art

An antenna module disclosed in International Publication No. 2018/230475 includes a flexible substrate. Patch antennas are formed on the flexible substrate.

The flexible substrate is mounted on one main surface of a mounting substrate via resin.

However, it is difficult to stabilize the ground potential of the patch antennas in the configuration disclosed in International Publication No. 2018/230475.

SUMMARY OF THE INVENTION

Preferred embodiments of the present invention provide electronic devices that are each able to stabilize the ground potential of patch antennas.

An electronic device according to a preferred embodiment of the present invention includes a first circuit substrate, a battery pack, and a second circuit substrate. The first circuit substrate performs various control operations of the electronic device. The battery pack includes a battery that supplies power to the first circuit substrate and includes a first main surface including a first planar conductor and a first side surface that is connected to the first main surface and is not parallel or substantially parallel to the first main surface. The second circuit substrate includes a first radiating conductor connected to the first circuit substrate, a connection terminal for the first circuit substrate, and a transmission line that connects the first radiating conductor and the connection terminal to each other.

The second circuit substrate is a flexible substrate including a bent portion in an intermediate portion thereof in the direction in which the transmission line extends such that the second circuit substrate faces the first side surface. The first radiating conductor overlaps the first planar conductor of the battery pack in plan view.

With this configuration, the ground potential of the first radiating conductor is provided by the first planar conductor of the battery pack and the ground potential is stable due to the first radiating conductor and the first planar conductor overlapping (facing) each other.

According to preferred embodiments of the present invention, electronic devices are each able to stabilize a ground potential of a patch antenna.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the accompanying drawings.

First Preferred Embodiment

Figure 1:
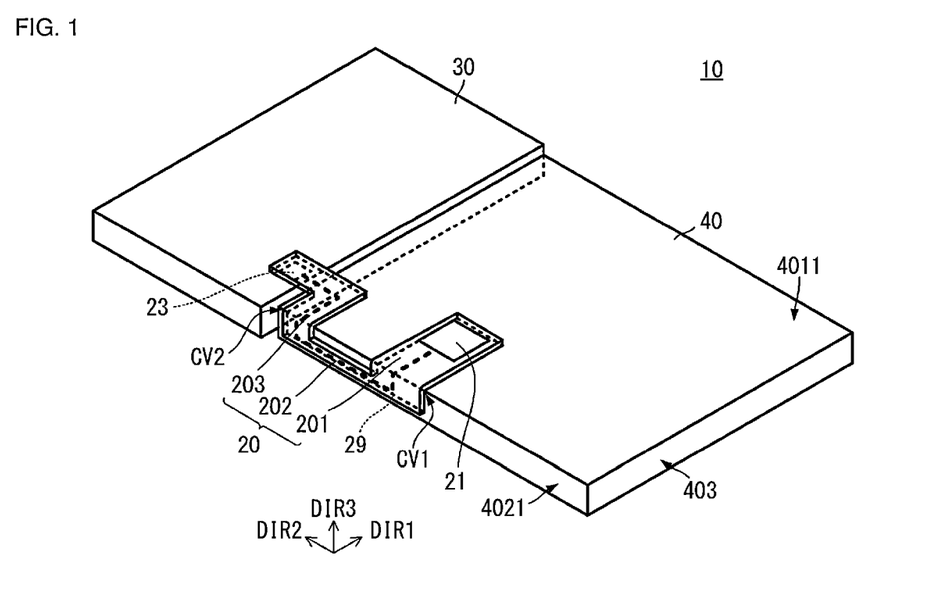
FIG. 1 is a perspective view of an electronic device according to a First Preferred Embodiment of the present invention.
Figure 2A:
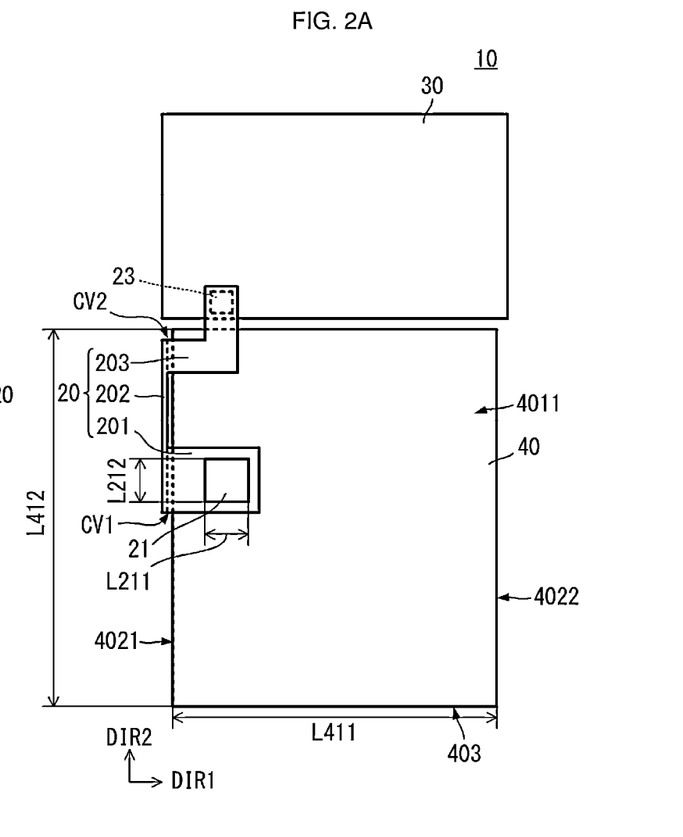
FIG. 2A is a plan view of the electronic device according to the First Preferred Embodiment and FIGS. 2B and 2C are side views of the electronic device according to the First Preferred Embodiment of the present invention.
Figure 2B:
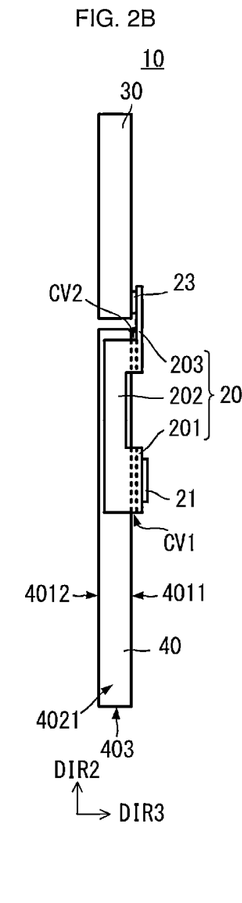
Figure 2C:
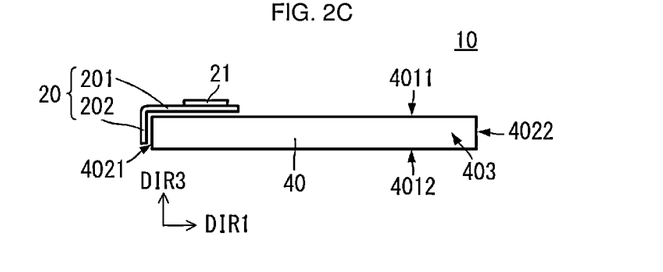

An electronic device according to a First Preferred Embodiment of the present invention will be described with reference to the drawings. FIG. 1 is a perspective view of an electronic device according to the First Preferred Embodiment. FIG. 2A is a plan view of the electronic device according to the First Preferred Embodiment and FIGS. 2B and 2C are side views of the electronic device according to the First Preferred Embodiment.

As illustrated in FIGS. 1, 2A, 2B, and 2C, an electronic device 10 includes a flexible substrate 20, a circuit substrate 30, and a battery pack 40. The circuit substrate 30 corresponds to a "first circuit substrate" and the flexible substrate 20 corresponds to a "second circuit substrate."

The circuit substrate 30 includes a rigid substrate, i.e., a substrate that is substantially not flexible. The circuit substrate 30 includes an insulating base material and various electronic circuit elements provided on or in, mounted on, or built into the base material. The circuit substrate 30 performs various control operations of the electronic device 10.

The circuit substrate 30 or the base material thereof is, for example, a resin substrate such as FR4, a low-temperature fired ceramic substrate (LTCC), or the like. The circuit substrate is, for example, a flat plate with a rectangular or substantially rectangular shape in plan view.

The battery pack 40 includes a battery that supplies power to an electronic circuit terminal of the circuit substrate 30. The battery pack 40 is provided with a casing including a conductor. The battery is built into the battery pack 40. The battery pack 40 and the circuit substrate 30 are connected to each other by an electrode supply line, which is not illustrated.

The battery pack 40 is, for example, a flat plate with a rectangular or substantially rectangular shape in plan view. The battery pack 40 includes a main surface 4011, a main surface 4012, a side surface 4021, a side surface 4022, and a side surface 403. The main surface 4011 and the main surface 4012 face each other and are parallel or substantially parallel to a first direction DIR1 and a second direction DIR2. The side surface 4021 and the side surface 4022 face each other and are parallel or substantially parallel to second direction DIR2 and a third direction DIR3. The main surface 4011 and the main surface 4012 are connected to each other by the side surface 4021 and the side surface 4022. The side surface 403 is parallel or substantially parallel to the first direction DIR1 and the third direction DIR3. The main surface 4011 and the main surface 4012 are connected to each other by the side surface 403. The main surface 4011 corresponds to a "first main surface" and the side surface 4021 corresponds to a "first side surface." A conductor of the main surface 4011 corresponds to a "first planar conductor."

The circuit substrate 30 and the battery pack 40 are disposed next to each other in the second direction DIR2. In other words, the circuit substrate 30 and the battery pack 40 are disposed on the same or substantially the same plane. Furthermore, the circuit substrate 30 and the battery pack 40 overlap when viewed in the second direction DIR2. As a result, the electronic device 10 can be reduced in size and thickness, for example.

The flexible substrate 20 is a flexible substrate with a flat film shape. The insulating base material of the flexible substrate 20 includes a thermoplastic resin mainly including a liquid crystal polymer, for example.

The flexible substrate 20 includes a radiating conductor 21, a terminal conductor 23, and a line conductor 29. The radiating conductor 21 corresponds to a "first radiating conductor." The terminal conductor 23 corresponds to a "connection terminal." The line conductor 29 corresponds to a "transmission line." The specific shape of the transmission line may be appropriately set in accordance with the specifications and so forth of the electronic device 10 and may be, for example, a single conductor line, a strip line, or a coplanar line.

The flexible substrate 20 extends in a direction in which the line conductor 29 extends. The flexible substrate 20 has a shape in which a first portion 201, a second portion 202, and a third portion 203 are connected to each other in this order in the direction in which the flexible substrate 20 extends.

The radiating conductor 21 is a conductor pattern having a prescribed shape such as a rectangular or substantially rectangular shape, for example. The dimensions of the radiating conductor 21 are dimensions that allow a radio-frequency signal of a prescribed frequency to be excited. A radio-frequency signal excited (transmitted or received) by the radiating conductor 21 corresponds to a "first radio-frequency signal." The radiating conductor 21 is disposed on the first portion 201 of the flexible substrate 20.

The terminal conductor 23 is a rectangular or substantially rectangular conductor pattern. The terminal conductor 23 is disposed on the third portion 203 of the flexible substrate 20.

The line conductor 29 is connected from the first portion 201 to the third portion 203 via the second portion 202. The line conductor 29 is connected to the radiating conductor 21 in the first portion 201. The position at which the line conductor 29 and the radiating conductor 21 are connected to each other is set based on a radiation current flowing along the radiating conductor 21 and other factors. The line conductor 29 is connected to the terminal conductor 23 in the third part 203. In other words, the radiating conductor 21 and the terminal conductor 23 are connected to each other by the line conductor 29.

The flexible substrate 20 includes a bent portion CV1 at a connection between the first portion 201 and the second portion 202 and a bent portion CV2 at a connection between the second portion 202 and the third portion 203. The bent portion CV1 and the bent portion CV2 are provided along the ridge where the main surface 4011 and the side surface 4021 of the battery pack 40 are connected to each other.

The first portion 201 overlaps (overlaps in plan view) and be close to the main surface 4011 of the battery pack 40 and is disposed so to be parallel or substantially parallel to the main surface 4011 of the battery pack 40. The second portion 202 is disposed so as to be close to the side surface 4021 of the battery pack 40 and so as to be parallel or substantially parallel to the side surface 4021 of the battery pack 40. The third portion 203 is disposed so as to be parallel or substantially parallel to the main surface 4011 of the battery pack 40 and a main surface of the circuit substrate 30 (mounting surface of flexible substrate 20). The terminal conductor 23 of the flexible substrate 20 is connected to the circuit substrate 30 through an electrically conductive bonding material, a connector, or the like.

In this configuration, a main surface, which is a radiating surface, of the radiating conductor 21 overlaps (overlaps in plan view), is parallel or substantially parallel to, and is close to the main surface 4011 of the battery pack 40. The main surface 4011 of the battery pack 40 includes a conductor and is configured to be connected to a ground potential by a connection means, which is not illustrated. Thus, a patch antenna is provided by the radiating conductor 21 and the battery pack 40, which includes a conductor.

As a result, the ground potential of the radiating conductor 21 is secured by the conductor of the main surface 4011 of the battery pack 40. Therefore, the ground potential of the patch antenna is stable. In particular, in this configuration, the area of the conductor of the main surface 4011 of the battery pack 40 is larger than the area of the radiating conductor 21. Therefore, a patch antenna with stable characteristics can be obtained.

Furthermore, the area of the main surface 4011 of the battery pack 40 is larger than the area of the first part 201 of the flexible substrate 20. Therefore, by using the main surface 4011 of the battery pack 40, the area of the conductor defining the ground of the patch antenna can be made larger than it would be in a case where a ground conductor is provided on or in the first portion 201 of the flexible substrate 20. This further improves the stability of the ground of the patch antenna.

In this configuration, a mode is illustrated in which a conductor portion of the battery pack 40 is used for the ground potential. However, it is also possible, for example, to use a portion of a casing of the electronic device for a ground potential as long as there is a conductive portion facing the radiating conductor 21.

Figure 3A:
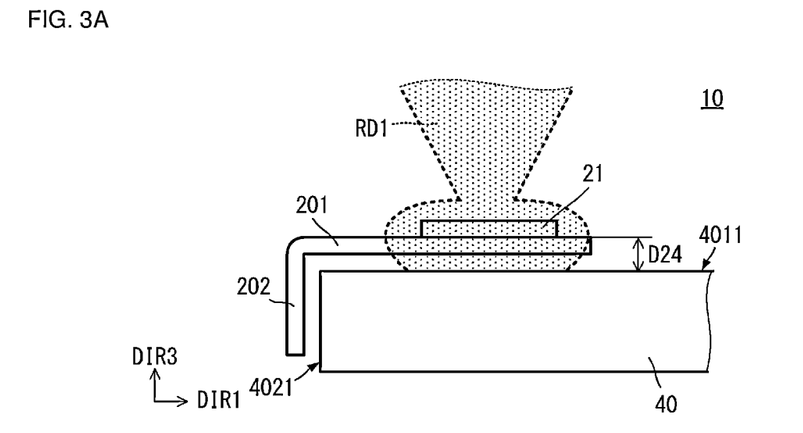
FIG. 3A is a diagram schematically illustrating an example of directivity of radiation characteristics obtained with the configuration of the First Preferred Embodiment of the present invention.
Figure 3B:
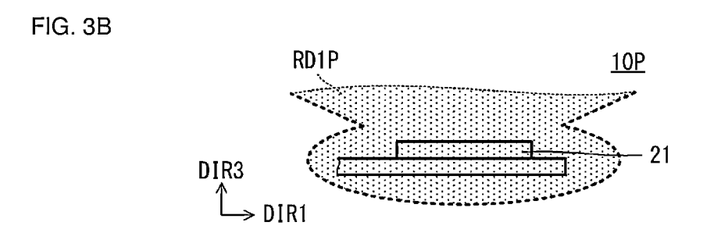
FIG. 3B is a diagram schematically illustrating an example of directivity of radiation characteristics according to a comparative example (configuration of the related art)
Figure 3C:
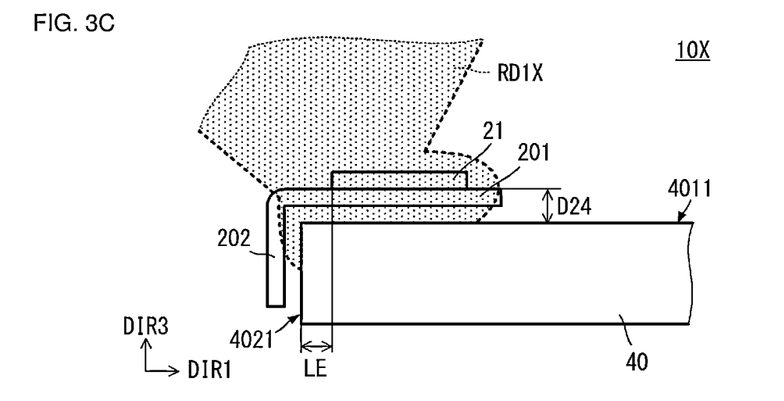
FIG. 3C is a diagram schematically illustrating another example of directivity of radiation characteristics obtained with the configuration of the First Preferred Embodiment of the present invention.

FIG. 3A is a diagram schematically illustrating an example of directivity of radiation characteristics obtained with the configuration of the First Preferred Embodiment, FIG. 3B is a diagram schematically illustrating an example of directivity of radiation characteristics according to a comparative example (configuration of the related art), and FIG. 3C is a diagram schematically illustrating another example of directivity of radiation characteristics obtained with the configuration of the First Preferred Embodiment.

As indicated by radiation characteristics RD1 in FIG. 3A, when a stable ground conductor is disposed on the opposite side of the radiating conductor 21 from the radiating surface of the radiating conductor 21 by utilizing the main surface 4011 of the battery pack 40, radiation towards the opposite side from the radiating surface is reduced or prevented and radiated power towards the side where the radiating surface is located can be improved. Furthermore, diffusion of radio waves (radio-frequency signal) in unwanted directions can be reduced or prevented and desired directivity can be easily obtained.

Furthermore, as indicated by radiation characteristics RD1X in FIG. 3C, in an electronic device 10X of a modification of a preferred embodiment of the present invention, the directivity of the radiation can be expanded on the side surface 4021 side with respect to the side where the main surface 4011 is located and a desired directivity can be obtained in this direction by moving the position of the radiating conductor 21 closer to the connecting ridge between the main surface 4011 and the side surface 4021. At this time, a distance LE between the position of the radiating conductor 21 and the connecting ridge between the main surface 4011 and the side surface 4021 may be appropriately set in accordance with the directivity that is desired to be obtained.

On the other hand, as indicated by radiation characteristics RD1P in FIG. 3B, when the configuration of the present invention is not used, in an electronic device 10P for comparison, radiation towards the opposite side from the radiating surface side cannot be reduced or prevented and radiated power towards the side where the radiating surface is located cannot be improved. Furthermore, diffusion of radio waves (radio-frequency signal) in unwanted directions occurs and it is difficult to obtain a desired directivity.

It is preferable that the dimensions of the radiating conductor 21 and the dimensions of the main surface 4011 (the dimensions of the conductor portion of the main surface 4011) have the relationships described below.

As illustrated in FIG. 2A, the radiating conductor 21 has a dimension L211 in the first direction DIR1 and a dimension L212 in the second direction DIR2. In addition, the main surface 4011 of the battery pack 40 has a dimension L411 in the first direction DIR1 and a dimension L412 in the second direction DIR2.

In the case where the radiating conductor 21 is excited by a radiation current flowing along the first direction DIR1, the dimension L411 of the main surface 4011 in the first direction DIR1 (corresponds to "radiation dimension" in this case) is preferably greater than or equal to approximately twice the dimension L211 of the radiating conductor 21 in the first direction DIR1. In other words, the dimension L411 of the main surface 4011 in the first direction DIR1 is preferably greater than or equal to the wavelength of the radio waves (radio-frequency signal) excited by the radiating conductor 21. As a result, a more stable ground potential is obtained and the radiation characteristics of the electronic device 10 can be further improved.

In the case where the radiating conductor 21 is excited by a radiation current flowing along the second direction DIR2, the dimension L412 of the main surface 4011 in the second direction DIR2 (corresponds to "radiation dimension" in this case) is preferably greater than or equal to approximately twice the dimension L212 of the radiating conductor 21 in the second direction DIR2. In other words, the dimension L412 of the main surface 4011 in the second direction DIR2 is preferably greater than or equal to the wavelength of the radio waves (radio-frequency signal) excited by the radiating conductor 21. As a result, a more stable ground potential is obtained and the radiation characteristics of the electronic device 10 can be further improved.

Furthermore, as illustrated in FIG. 3A, a distance D24 between the radiating conductor 21 and a main surface that is the main surface 4011 of the battery pack 40 preferably lies in the following range.

The distance D24 between the radiating conductor 21 and the main surface defined by the main surface 4011 of the battery pack 40 is preferably less than or equal to about ¼ the wavelength of radio waves (radio-frequency signal) excited by the radiating conductor 21. As a result, a more stable ground potential is obtained and the radiation characteristics of the electronic device 10 can be further improved.

Furthermore, the bent portion CV1 and the bent portion CV2 are preferably provided through plastic deformation. Thus, the shapes of the bent portions CV1 and CV2 are maintained during use and assembly of the electronic device 10. Therefore, it is easy to assemble the electronic device 10 when the electronic device 10 is to be assembled. In addition, the arrangement of the flexible substrate 20 with respect to the circuit substrate 30 and battery pack 40 can be easily and more reliably maintained without the use of adhesive materials and so on.

Furthermore, in the above-described configuration, the radiating conductor 21 and the terminal conductor 23 are disposed on different main surfaces of the flexible substrate 20 and the exposed surfaces of the conductors are different and face in opposite directions. Therefore, even if unwanted waves leak from the terminal conductor 23, unwanted interference between the unwanted waves and the radio-frequency signal radiated by the radiating conductor 21 can be reduced or prevented and degradation of the characteristics of the patch antenna can be reduced or prevented.

Second Preferred Embodiment

Figure 4A:
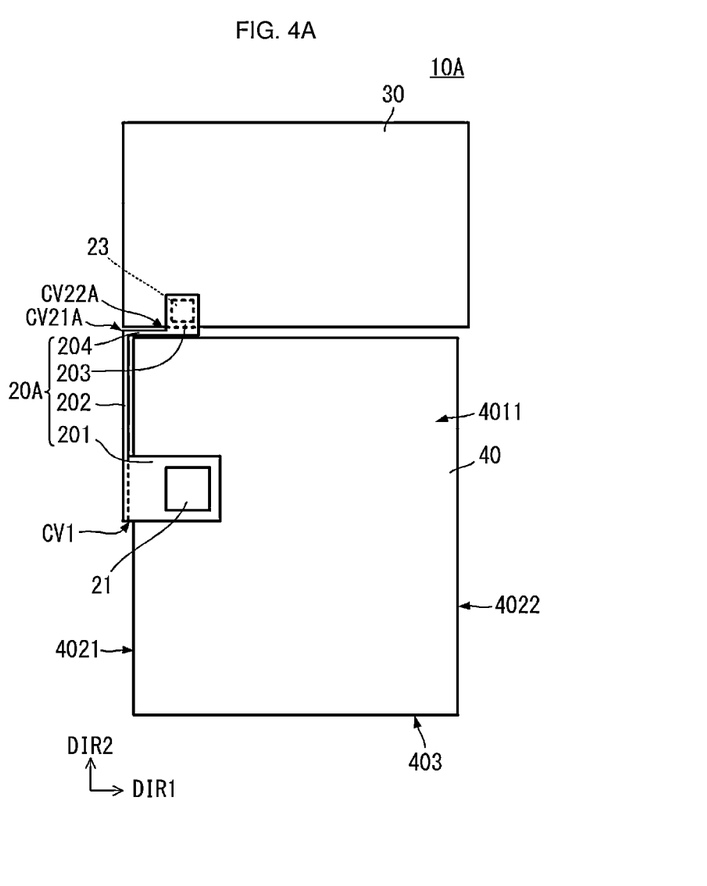
FIG. 4A is a plan view of an electronic device according to a Second Preferred Embodiment of the present invention and FIG. 4B is a side view of the electronic device according to the Second Preferred Embodiment of the present invention.

An electronic device according to a Second Preferred Embodiment of the present invention will be described with reference to the drawings. FIG. 4A is a plan view of the electronic device according to the Second Preferred Embodiment and FIG. 4B is a side view of the electronic device according to the Second Preferred Embodiment.

Figure 4B:
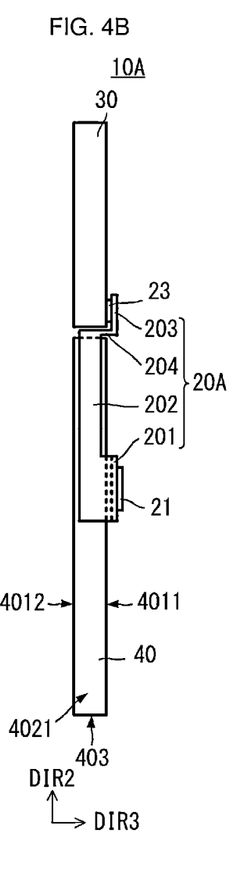

As illustrated in FIGS. 4A and 4B, an electronic device 10A according to the Second Preferred Embodiment differs from the electronic device 10 according to the First Preferred Embodiment in the configuration of a flexible substrate 20A. The rest of the configuration of the electronic device 10A is the same or substantially the same as that of the electronic device 10 and description of the same or corresponding portions is omitted.

The flexible substrate 20A differs from the flexible substrate 20 according to the First Preferred Embodiment in that the flexible substrate 20A includes a bent portion CV21A and a bent portion CV22A. The rest of the configuration of the flexible substrate 20A is the same or substantially the same as that of the flexible substrate 20 and description of the same or corresponding portions is omitted.

The flexible substrate 20A includes the bent portion CV21A and the bent portion CV22A in the vicinity of a connection between the second portion 202 and the third portion 203. The bent portion CV21A and the bent portion CV22A are each shaped so as to be bent or substantially bent at a right angle.

In this configuration, as illustrated in FIGS. 4A and 4B, in the electronic device 10A, a portion of the second portion 202 can be disposed between the circuit substrate 30 and the battery pack 40. In other words, the second portion 202 is not disposed on the main surface 4011 of the battery pack 40 and only the first portion 201 including the radiating conductor 21 is disposed on the main surface 4011 of the battery pack 40.

As a result, electromagnetic field coupling between the radiating conductor 21 and the line conductor 29 of the second portion 202 (not illustrated) can be reduced or prevented. Therefore, the radiation characteristics of the electronic device 10A can further improved.

Third Preferred Embodiment

Figure 5A:
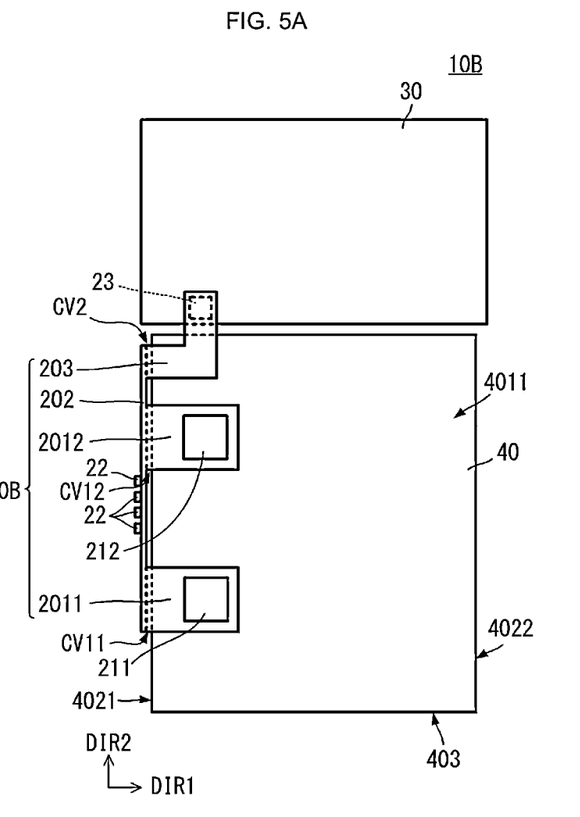
FIG. 5A is a plan view of an electronic device according to a Third Preferred Embodiment of the present invention and FIG. 5B is a side view of the electronic device according to the Third Preferred Embodiment of the present invention.

An electronic device according to a Third Preferred Embodiment of the present invention will be described with reference to the drawings. FIG. 5A is a plan view of the electronic device according to the Third Preferred Embodiment and FIG. 5B is a side view of the electronic device according to the Third Preferred Embodiment.

Figure 5B:
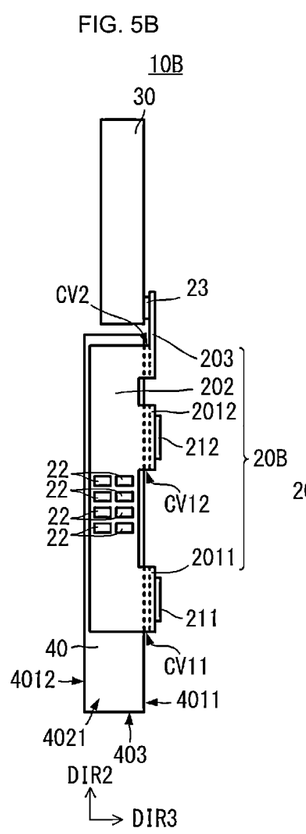

As illustrated in FIGS. 5A and 5B, an electronic device 10B according to the Third Preferred Embodiment differs from the electronic device 10 according to the First Preferred Embodiment in the configuration of a flexible substrate 20B. The rest of the configuration of the electronic device 10B is the same or substantially the same as that of the electronic device 10 and description of the same or corresponding portions is omitted.

The flexible substrate 20B includes a plurality of first portions 2011 and 2012. A radiating conductor 211 is disposed on the first portion 2011 and a radiating conductor 212 is disposed on the first portion 2012. The first portion 2011 and the first portion 2012 are disposed near to and parallel or substantially parallel to the main surface 4011 of the battery pack 40. In other words, the radiating conductor 211 and the radiating conductor 212 are disposed near to and parallel or substantially parallel to the main surface 4011 of the battery pack 40. The first portion 2011 is connected to the second portion 202 via a bent portion CV11 and the first portion 2012 is connected to the second portion 202 via a bent portion CV12.

The flexible substrate 20B includes a plurality of radiating conductors 22 on the second portion 202. The radiating conductors 22 correspond to a "second radiating conductor." The dimensions of the radiating conductors 22 are dimensions that allow a radio-frequency signal of a prescribed frequency to be excited. A radio-frequency signal excited (transmitted or received) by the radiating conductors 22 corresponds to a "second radio-frequency signal" and is a signal having a higher frequency than the "first radio-frequency signal."

The plurality of radiating conductors 22 are shaped so as to be smaller than the radiating conductor 211 and the radiating conductor 212. Therefore, the plurality of radiating conductors 22 transmit and receive higher frequency radio-frequency signals (for example, millimeter waves or quasi-millimeter waves) than the radiating conductor 211 and the radiating conductor 212. The plurality of radiating conductors 22 are disposed in a prescribed pattern.

The second portion 202 is disposed near to and parallel to or substantially parallel the side surface 4021 of the battery pack 40, and therefore the plurality of radiating conductors 22 are disposed near to and parallel or substantially parallel to the side surface 4021 of the battery pack 40. More specifically, the plurality of radiating conductors 22 are disposed so as to overlap, be near to, and be parallel or substantially parallel to a conductor of the side surface 4021 of the battery pack 40. The side surface 4021 of the battery pack 40 is a conductor. The side surface 4021 corresponds to a "second planar conductor."

This configuration stabilizes the ground potential for the plurality of radiating conductors 22 and the radiation characteristics of a patch antenna including the plurality of radiating conductors 22 are improved.

Figure 6:
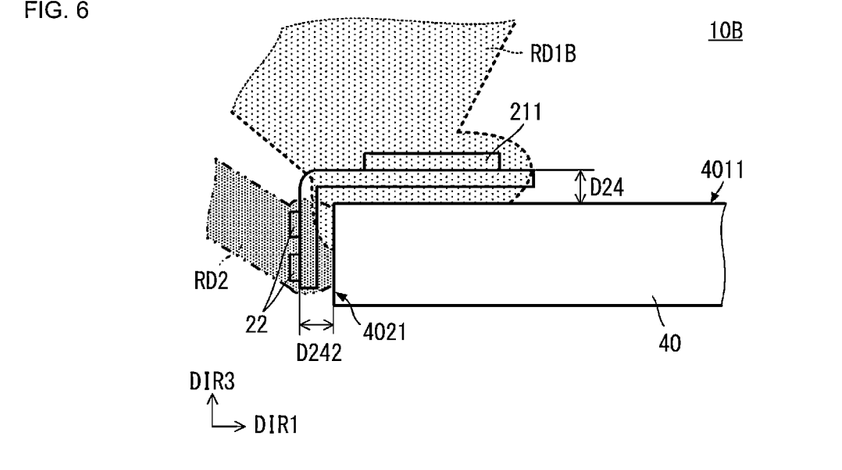
FIG. 6 is a diagram schematically illustrating an example of directivity of radiation characteristics obtained with the configuration of the First Preferred Embodiment of the present invention.

FIG. 6 is a diagram schematically illustrating an example of directivity of radiation characteristics obtained with the configuration of the First Preferred Embodiment. As indicated by radiation characteristics RD1B in FIG. 6, when a stable ground conductor is disposed on the opposite side of the radiating conductors 211 and 212 from the radiating surfaces of the radiating conductors 211 and 212 by utilizing the main surface 4011 of the battery pack 40, radiation towards the opposite side from the radiating surfaces of the radiating conductors 211 and 212 is reduced or prevented and radiated power towards the side where the radiating surfaces of the radiating conductors 211 and 212 are located can be improved. Furthermore, diffusion of radio waves (radio-frequency signal), of radiation performed using the radiating conductors 211 and 212, in unwanted directions can be reduced or prevented and desired directivity can be easily obtained.

In addition, as indicated by radiation characteristics RD2 in FIG. 6, when a stable ground conductor is disposed on the opposite side of the plurality of radiating conductors 22 from the radiating surfaces of the plurality of radiating conductors 22 by utilizing the side surface 4021 of the battery pack 40, radiation towards the opposite side from the radiating surfaces of the plurality of radiating conductors 22 is reduced or prevented and radiated power towards the side where the radiating surfaces of the plurality of radiating conductors 22 are located can be improved. Furthermore, diffusion of radio waves (radio-frequency signal), of radiation using the plurality of radiating conductors 22, in unwanted directions can be reduced or prevented and desired directivity can be easily obtained.

Power can be supplied to the plurality of radiating conductors 22 in a phase-controlled manner in order to control the beam as illustrated by the radiation characteristics RD2 in FIG. 6. The communication control device that performs this phase control may be mounted on the circuit substrate 30, for example, or may be disposed on the second portion 202, as illustrated in a preferred embodiment described below. In this case, the main alignment direction of the plurality of radiating conductors 22 (direction in which beam is steered) is preferably parallel or substantially parallel to the length direction of the side surface 4021.

Furthermore, similarly to as in the above-described First Preferred Embodiment, a distance D242 between the plurality of radiating conductors 22 and the side surface 4021 of the battery pack 40 is preferably, for example, less than or equal to about ¼ the wavelength of radio waves (radio-frequency signal) excited by the plurality of radiating conductors 22.

In addition, the dimensions of the radiating conductor 211 and the radiating conductor 212 and the dimensions of the main surface 4011 of the battery pack 40 preferably have the same or substantially the same relationships with each other as the relationships between the dimensions of the radiating conductor 21 and the dimensions of the main surface 4011 of the battery pack 40 in the First Preferred Embodiment described above. Furthermore, the dimensions of the plurality of radiating conductors 22 and the dimensions of the side surface 4021 of the battery pack 40 preferably have the same or substantially the same relationships with each other as the relationships between the dimensions of the radiating conductor 21 and the dimensions of the main surface 4011 of the battery pack 40 in the First Preferred Embodiment described above.

Fourth Preferred Embodiment

Figure 7A:
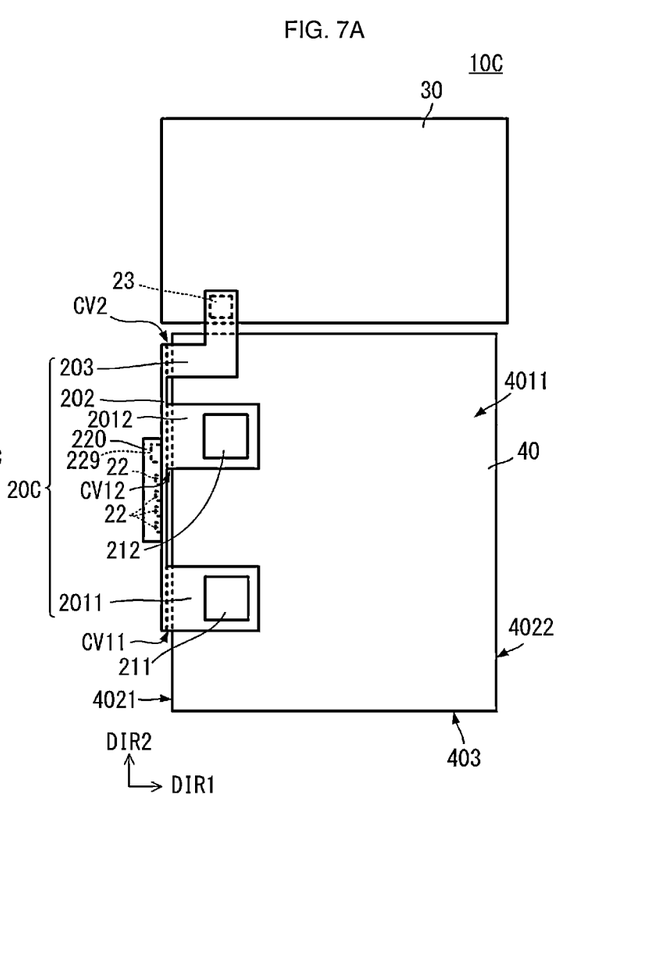
FIG. 7A is a plan view of an electronic device according to a Fourth Preferred Embodiment of the present invention and FIG. 7B is a side view of the electronic device according to the Fourth Preferred Embodiment of the present invention.

An electronic device according to a Fourth Preferred Embodiment of the present invention will be described with reference to the drawings. FIG. 7A is a plan view of the electronic device according to the Fourth Preferred Embodiment and FIG. 7B is a side view of the electronic device according to the Fourth Preferred Embodiment.

Figure 7B:
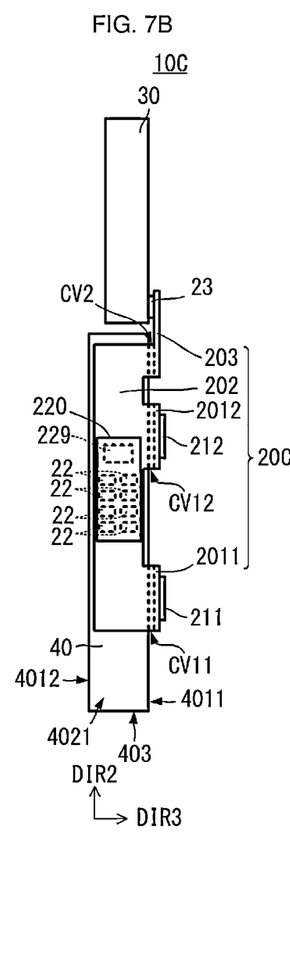

As illustrated in FIGS. 7A and 7B, an electronic device 10C according to the Fourth Preferred Embodiment differs from the electronic device 10B according to the Third Preferred Embodiment in the configuration of a flexible substrate 20C. The rest of the configuration of the electronic device 10C is the same or substantially the same as that of the electronic device 10B and description of the same or corresponding portions is omitted.

The flexible substrate 20C includes a communication module 220. The communication module 220 includes a plurality of radiating conductors 22 and a communication control device 229, which are packaged together. The communication module 220 is disposed on the second portion 202 of the flexible substrate 20C.

With this configuration, the electronic device 10C is able to achieve the same or substantially the same advantageous operational effects as the electronic device 10B. Furthermore, since the distance between the communication control device 229 and the plurality of radiating conductors 22 is short, power can be supplied with high-precision phase control even for radio-frequency signals having short wavelengths such as millimeter and quasi-millimeter waves. Furthermore, as illustrated in FIG. 7A, since the communication control device 229 is disposed between the circuit substrate 30 and the plurality of radiating conductors 22, an unwanted increase in wiring can be reduced or prevented. Therefore, loss can be further reduced for radio-frequency signals having short wavelengths such as millimeter waves and quasi-millimeter waves.

Fifth Preferred Embodiment

Figure 8:
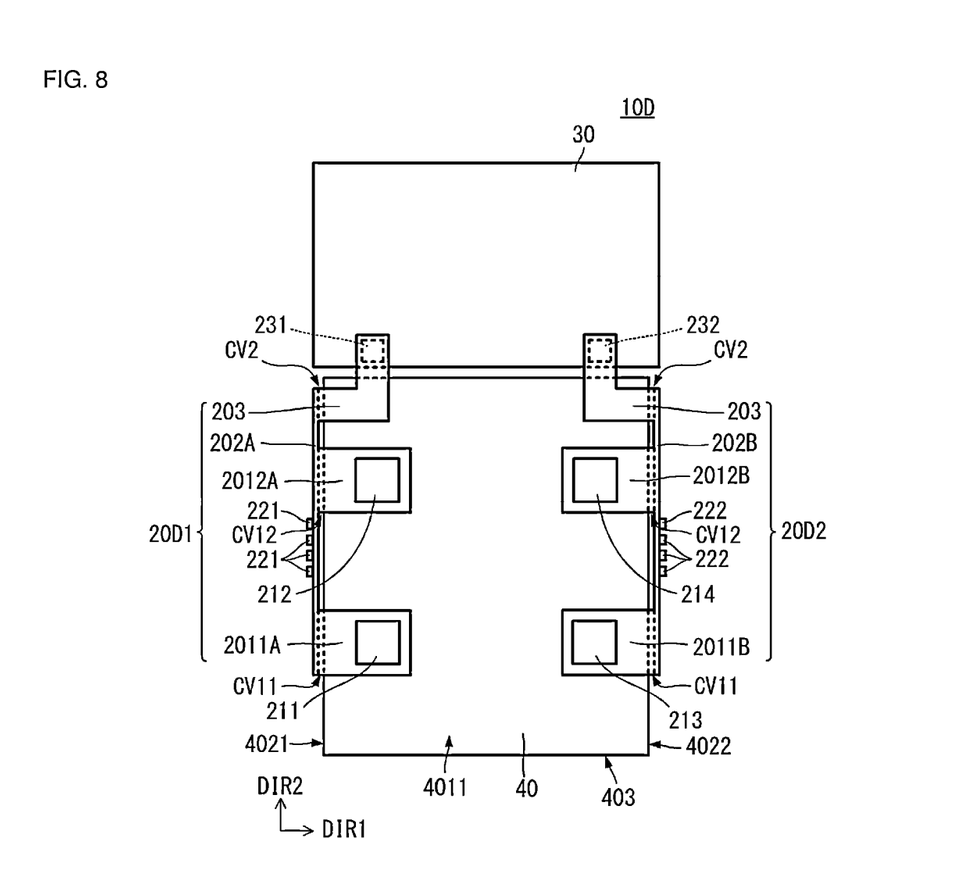
FIG. 8 is a plan view of an electronic device according to a Fifth Preferred Embodiment of the present invention.

An electronic device according to a Fifth Preferred Embodiment of the present invention will be described with reference to the drawings. FIG. 8 is a plan view of the electronic device according to the Fifth Preferred Embodiment.

As illustrated in FIG. 8, an electronic device 10D according to the Fifth Preferred Embodiment differs from the electronic device 10B according to the Third Preferred Embodiment in that the electronic device 10D includes a plurality of flexible substrates 20D1 and 20D2. The rest of the configuration of the electronic device 10D is the same or substantially the same as that of the electronic device 10B and description of the same or corresponding portions is omitted.

The flexible substrate 20D1 and the flexible substrate 20D2 have the same or substantially the same configuration, but the bending directions of bent portions CV11, CV12, and CV2 thereof are opposite to each other. The flexible substrate 20D1 includes a radiating conductor 211 on a first portion 2011A and a radiating conductor 212 on a first portion 2012A. The flexible substrate 20D1 includes a plurality of radiating conductors 221 on a second portion 202A.

The flexible substrate 20D2 includes a radiating conductor 213 on a first portion 2011B and a radiating conductor 214 on a first portion 2012B. The flexible substrate 20D2 includes a plurality of radiating conductors 222 on a second portion 202B.

The flexible substrate 20D1 is disposed so that the second portion 202A is near to and faces the side surface 4021. The flexible substrate 20D2 is disposed so that the second portion 202B is near to and faces the side surface 4022. The side surface 4022 corresponds to a "second side surface."

With this configuration, the electronic device 10D is able to exhibit the same or substantially the same advantageous operational effects as the electronic device 10B. Furthermore, the electronic device 10D is able to transmit and receive radio-frequency signals to and from the outside from two side surfaces of the battery pack 40.

In the above-described preferred embodiments, configurations have been described in which no radiating conductors are disposed on the side surface 403 of the battery pack 40, which is on the opposite side from the surface of the battery pack 40 that faces the circuit substrate 30, but radiating conductors may also be disposed on the side surface 403.

Furthermore, although not particular restricted in the above-described preferred embodiments, the main surface 4011, the side surface 4021, and the side surface 4022 of the battery pack 40 are preferably entirely or substantially entirely made up of conductors, but it is sufficient that conductors are disposed so as to at least overlap the entirety or substantially the entirety of regions where the radiating conductors are disposed. However, it is more preferable that the above-described conditions regarding the dimensions are satisfied.

Furthermore, in the above description, rectangular or substantially rectangular radiating conductors have been described as an example, but the radiating conductors do not have to have a rectangular or substantially rectangular shape, and may instead have, for example, a triangular or substantially triangular shape, and so forth.

In addition, the configurations of the preferred embodiments described above may be combined with each other as appropriate and advantageous operational effects resulting from those combinations can be obtained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An electronic device comprising:
a first circuit substrate;
a battery pack including a battery to supply power to the first circuit substrate and includes a first main surface including a first planar conductor and a first side surface that is connected to the first main surface and is not parallel or substantially parallel to the first main surface; and
a second circuit substrate including a first radiating conductor connected to the first circuit substrate, and a transmission line connected to the first radiating conductor; wherein
the second circuit substrate is a flexible substrate including a bent portion at a central portion in a direction in which the transmission line extends such that the second circuit substrate faces the first side surface; and
the first radiating conductor overlaps the first planar conductor in plan view.

2. The electronic device according to claim 1, wherein the second circuit substrate connects the first radiation conductor and the first circuit substrate.

3. The electronic device according to claim 1, further comprising a plurality of the first radiating conductors overlapping the first planar conductor.

4. The electronic device according to claim 1, wherein when a dimension of the first radiating conductor in a direction in which a radiation current flows is a radiation dimension, a dimension of the first planar conductor in a direction parallel or substantially parallel to the radiation dimension is greater than or equal to about twice the radiation dimension.

5. The electronic device according to claim 1, wherein a distance between the first radiating conductor and the first planar conductor is less than or equal to about ¼ a wavelength of a first radio-frequency signal transmitted and received by the first radiating conductor.

6. The electronic device according to claim 1, further comprising:
a second radiating conductor to transmit and receive a second radio-frequency signal with a shorter wavelength than a first radio-frequency signal transmitted and received by the first radiating conductor; wherein
the battery pack includes a second planar conductor at the first side surface; and
the second radiating conductor overlaps the second planar conductor.

7. The electronic device according to claim 5, further comprising:
a plurality of the second radiating conductors disposed in an array pattern; and
a communication controller to phase adjust power supplied to the plurality of second radiating conductors; wherein
the plurality of second radiating conductors and the communication controller define a packaged communication module.

8. The electronic device according to claim 1, further comprising:
a plurality of the second circuit substrate; wherein
the battery pack includes a second side surface connected to the first main surface and is not parallel or substantially parallel to the first main surface; and
the plurality of second circuit substrates include portions that respectively face the first side surface and the second side surface.

9. The electronic device according to claim 1, wherein the bent portion includes plastically deformed material.

10. The electronic device according to claim 1, wherein the first circuit substrate is thicker than the second circuit substrate.

11. The electronic device according to claim 1, wherein the first circuit substrate and the battery pack are in a same plane; and
the transmission line extends along the first side surface in a direction perpendicular or substantially perpendicular to a thickness direction of the battery pack.

12. An electronic device comprising:
a first circuit substrate;
a casing that houses the first circuit substrate and includes a first main surface including a first planar conductor and a first side surface connected to the first main surface and is not parallel or substantially parallel to the first main surface; and
a second circuit substrate includes a first radiating conductor connected to the first circuit substrate, and a transmission line connected to the first radiating conductor; wherein
the second circuit substrate is a flexible substrate including a bent portion in a central portion in the direction in which the transmission line extends so that the second circuit substrate faces the first side surface; and
the first radiating conductor overlaps the first planar conductor in plan view.

13. The electronic device according to claim 1, further comprising:
a connection terminal to connect to the first circuit substrate; wherein
the transmission line connects the first radiating conductor and the connection terminal to each other.

14. The electronic device according to claim 13, wherein the first radiating conductor and the connection terminal are on different main surfaces of the second circuit substrate.

15. The electronic device according to claim 12, wherein the second circuit substrate connects the first radiation conductor and the first circuit substrate.

16. The electronic device according to claim 12, further comprising a plurality of the first radiating conductors overlapping the first planar conductor.

17. The electronic device according to claim 12, wherein when a dimension of the first radiating conductor in a direction in which a radiation current flows is a radiation dimension, a dimension of the first planar conductor in a direction parallel or substantially parallel to the radiation dimension is greater than or equal to about twice the radiation dimension.

18. The electronic device according to claim 12, wherein a distance between the first radiating conductor and the first planar conductor is less than or equal to about ¼ a wavelength of a first radio-frequency signal transmitted and received by the first radiating conductor.

19. The electronic device according to claim 12, wherein the bent portion includes plastically deformed material.

20. The electronic device according to claim 12, further comprising:
a connection terminal to connect to the first circuit substrate; wherein
the transmission line connects the first radiating conductor and the connection terminal to each other; and the first radiating conductor and the connection terminal are on different main surfaces of the second circuit substrate.

\* \* \* \* \*